Oct. 11, 1955   B. H. LOCKE   2,720,322
MATERIALS PILING DEVICES
Filed March 29, 1954

INVENTOR
Burton H. Locke

United States Patent Office 2,720,322
Patented Oct. 11, 1955

2,720,322

MATERIALS PILING DEVICES

Burton H. Locke, Framingham, Mass.

Application March 29, 1954, Serial No. 419,219

10 Claims. (Cl. 214—6)

This invention relates to apparatus to facilitate the conveying and the piling of cartons or packages or other items of material received from an infeed conveyor onto a carrying platform such as a skid or pallet or other structure in successive layers to form a stacked load thereon for transportation thereon by means of a portable lift truck.

One object of the invention is to arrange to load the platform with it supported near floor level so that the same can be easily transported away by a lift truck or by a gravity roller conveyor and also to eliminate any requirement of the apparatus to raise or lower the platform as it is being loaded. This confines the apparatus to a minimum light construction as there would be no strain imposed on any of the members above the base structure.

Another object is to convey the articles of merchandise individually by power conveying means to each elevation required for forming each layer onto the platform thereby eliminating any manual lifting of the articles.

Another object is to provide a simple conveyor means to extend from a fixed infeed elevation to the different elevations required to convey the articles to the said elevations for manual forming into layers, respectively, on the platform and to provide a simple means to actuate the conveyor means.

Another object is to provide a vertical fence against which the articles or packages may be placed to form an even vertical pile on the platform and an adjustable means to afford prelocation of the platform relative to the said fence so that the packages will become located in a predetermined position on the platform when positioned against the fence.

Another object is to provide rollers on the fence to contact the packages to minimize the friction caused by the packages moving along the fence as the loaded platform is moved out of the device, thus minimizing the manual force required to move the loaded platform out of the device.

Figures 1, 2:
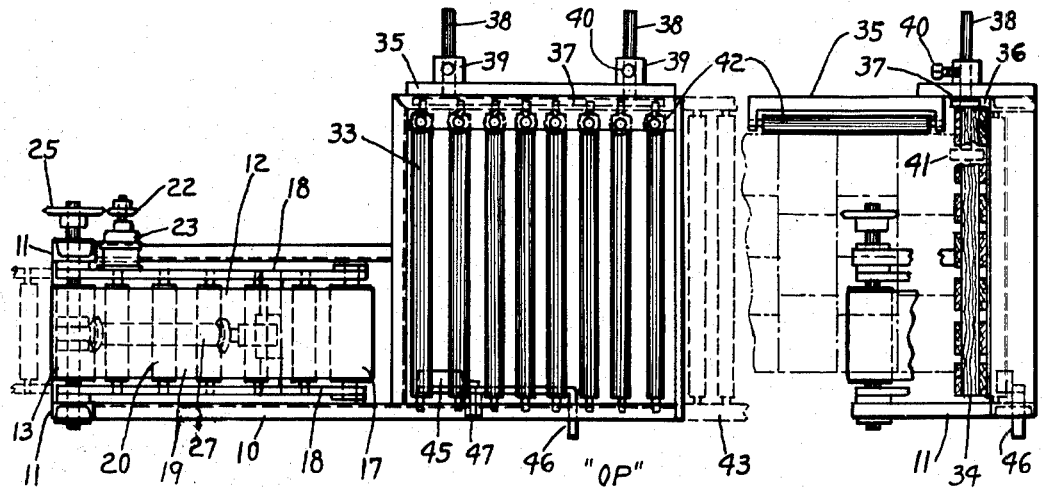
Figure 1 is a plan view of my improved piling device.
Figure 2 is an elevation of the same taken at the discharge end.
Figure 3:
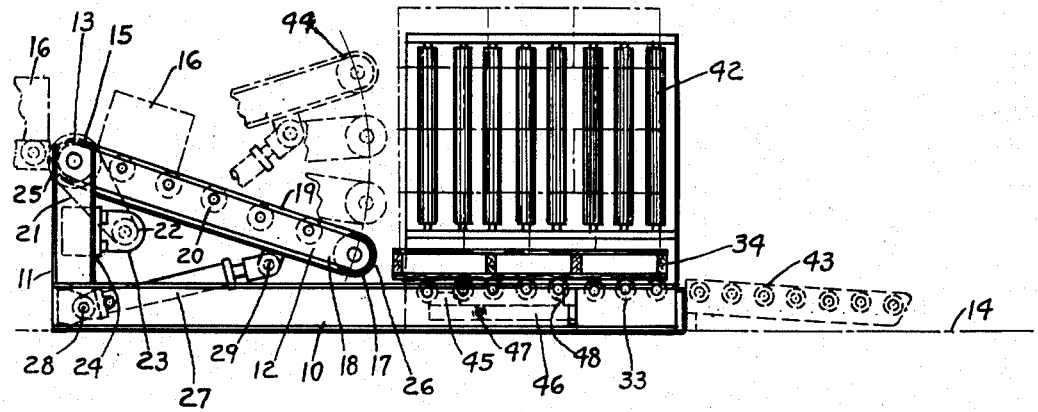
Figure 3 is an elevation of the same taken at the operating side.

My improved materials piling device comprises a stationary base structure 10 that normally rests on a floor and has a plurality of upright members 11 at one end thereof to pivotally support a driven conveyor 12 by means of the shaft of the conveyor drive roll 13 extending through the said members. Roll 13 is positioned about 30" above the floor 14 to position the infeed end 15 of the conveyor 12 in position to receive cartons or other packages of merchandise 16 from a carton sealer or other discharge conveyor which normally discharge cartons substantially this distance above the floor.

The conveyor 12 comprises the drive roll 13 and a driven roll 17 rotatively mounted in side structures 18, of conveyor 12, and a belt 19 passing over the said rolls. Relatively smaller rolls 20 are mounted in side structures 18 and are positioned to contact and thereby assist the upper side of the belt 19 in supporting the packages 16. Suitable conventional means to take-up the belt 19 to proper operating tension could be employed. However, such take-up means are not shown for reason of simplification of the drawing.

The conveyor 12 is driven by a chain 21 operating on a sprocket 22, secured to a motor 23 which is mounted on a bracket structure 24 secured to upright members 11, and a sprocket 25 rigidly mounted on the shaft of driven roll 13.

The outer end 26 of conveyor 12 swings down and up as the conveyor 12 is pivoted on the shaft 13 by means, in this instance, of a hydraulic cylinder 27 which is pivotally mounted to frame structure 10 at 28 and pivotally attached to conveyor 12 at 29. Oil is fed under pressure to the lower end of the cylinder to effect swinging of the conveyor 12 upwardly and is exhausted at the same end of the cylinder to effect lowering of the conveyor. The oil can be supplied by a conventional hydraulic power unit, not shown, and can be controlled in its flow to the cylinder by a conventional control valve, also not shown, which can be located in any convenient operating position.

A plurality of free rotating rolls 33 are generally mounted in the main structure 10 to support a platform 34 to be loaded with packages 16 in pattern formed layers. Rolls 33 are positioned to support the platform 34 substantially beyond the discharge end 26 of conveyor 12 so as to eliminate interference of any packages that may be piled on the platform with the conveyor at all swingable positions thereof.

It will be noted that the pivot point of the conveyor 12 is substantially midway between the floor and the top of a normal load of packages so that the conveyor is swung substantially the same distance above and below its pivot during the loading of the platform. This minimizes the deviation of the discharge end 26 of the conveyor from the vertical pile of packages during its travel and thus insures delivery of the packages close to the pile for manipulation into pattern formed layers, respectively, and thus minimizes the manual handling of the packages.

There is a vertical fence 35 rigid to frame structure 10 against which the packages 16 are normally placed as they are formed in layers on the platform. Fence 35 serves as a guide in forming the pile in a neat vertical stack on the platform and assists in retaining the packages in position until the platform is completely loaded. There is an undercut area 36 at the bottom of the fence 35 which has height to receive the platform 34 but not to include any normal package that may be loaded onto the platform.

There is a bar member 37 adjustably mounted within the area 36 to abut the platform 34 and thereby position the same relative to the fence 35. The bar 37 has a plurality of rod portions 38 that have sliding engagement in bosses 39 provided on the fence 35 and set screws 40 are provided to secure the rods 38 in any predetermined adjusted position in bosses 39 and thus anchor the bar in any such adjusted position.

When an underhung load of packages is required on the platform 34, the bar 37 is adjusted within the recess area 36, as shown in full lines. When it is required that the packages overhang the platform, bar 37 is adjusted out beyond the fence 35, such as shown by broken lines 41 to position the platform outside of the fence 35 as the packages are arranged against the fence.

Generally a plurality of free rotative rolls 42 are mounted vertically on fence 35 to contact the packages 26 and facilitate the movement of the packages along the fence when the loaded platform is moved out of the device and onto a gravity roller conveyor 43, shown in dotted lines. Gravity roller conveyor 43 is generally provided adjacent to the device to convey the loaded platforms away by gravity after they are manually moved out of the device and onto it.

The fence 35 could be of a plate construction instead of rollers. However, in such a construction the friction of the packages against the fence would increase the force requirement to move the loaded platform out of the device.

The conveyor 12 is in the low position as shown in full lines to convey packages to the platform for arrangement of the first layer of packages thereon. The conveyor is pivoted upwardly intermittently to the various positions indicated by broken lines for conveying packages to be arranged to form the 2nd, 3rd, and 4th layers of packages on the platform. After the last layer is formed on the load, the conveyor is at its maximum high position, shown in broken lines 44.

To insure against the platform moving on rolls 33 when being loaded, a brake shoe 45 is applied to two of the rolls 33 by means of a lever 46 pivotally mounted at 47 on main frame structure 10. Brake shoe 45 is disposed so that gravity retains it in contact with the rolls to keep them from turning during the loading of the platform. The lever 46 is manually raised to seat in a notch 48 to release and hold the brake shoe away from the rolls thereby permitting the rolls to turn free when the loaded platform is moved thereover in being discharged from the device.

Obviously, the conveyor driving motor would be provided with electrical controls so that the same can be started and stopped to suit the package conveying requirement in the operation of the device.

The operation of the device follows:

The operator generally stands on the side of the device marked "OP," shown in Figure 1. An empty platform is placed on the device and the brake 45 is set to help retain the platform from moving on the rolls 33. The conveyor is swung down in position to convey packages to the top of the platform and the operator arranges the packages in pattern form on top of the platform as they arrive to form the first layer. Then the conveyor is raised by means set forth until it is in position to convey packages to the top of the layer of packages just previously arranged for arrangement in a patterned formed second layer on the platform, and so on until the platform is completely loaded with packages. The brake 45 is then released and the loaded platform is manually pushed out onto the gravity roller conveyor and an empty platform is placed on the device to replace it. It will be noted that there is no lifting of packages required which is a main object of the device to avoid.

I do not wish to be confined to the exact details set forth as the same are susceptible of modification within the spirit and scope of the invention.

I claim:

1. In a device to facilitate the piling of articles of merchandise onto a carrying platform in successive layers comprising a main stationary frame structure that may rest on a floor, said frame structure being disposed to support said platform near the floor at one end thereof and to pivotally support a swingable driven conveyor substantially above the floor at an end opposite the platform supporting end thereof, the said conveyor being disposed to be swung downwardly and upwardly relative to its pivoted support on the said main frame structure, means to effect and to control the swinging of the said conveyor, the swinging range of said conveyor being such as to permit the swinging down of the same to convey articles of merchandise to the top of a said platform that may be supported on the said main structure for the purpose of being manually arranged to form a layer of said articles on the platform and to swing upwardly thereabove to convey other articles to the top of a layer of previously arranged articles on said platform for the purpose of being manually arranged to form a subsequent layer of articles on the platform, respectively, until the platform is completely loaded with articles, a stationary fence rigid with said frame structure to provide means for locating the said articles on the platform by the same being positioned thereagainst, the said fence having an undercut portion disposed to receive an edge of a said platform, a stop positioning means adjustably mounted to operate in said undercut portion of the fence to abut a said platform and thereby provide means to position the same in predetermined relationship to the said fence for the purpose set forth.

2. A device as described in claim 1, with a plurality of rollers in the said main frame structure and disposed to support the said platform during the loading thereof and to facilitate the manual moving of the same out of the device.

3. A device as described in claim 1, with a gravity roller conveyor disposed outside of the said device to receive and convey away by means of gravity any platform that may be moved out of the device.

4. A device as described in claim 2, with a gravity roller conveyor disposed outside of the said device to receive and convey any platform that may be moved out of the device and thereonto.

5. A device as described in claim 1, with vertically disposed rollers on said fence to facilitate the horizontal movement of articles that may be loaded on the said platform against the fence upon movement of a loaded platform out of the device.

6. A device as described in claim 1, with means to control the conveying movement of the said conveyor.

7. A device as described in claim 2, with brake means disposed to contact at least one of the said rollers during the loading of a platform for the purpose set forth.

8. A device to facilitate the piling of packages of merchandise onto a carrying platform comprising a base portion to support a said platform on which packages of merchandise may be piled in pattern formed layers and a vertical fence portion against which the packages may be placed to facilitate being stacked in vertical alignment on a said platform that may be supported on the said device, the said fence portion having an undercut portion disposed to receive an edge of a said platform, a stop positioning means adjustably mounted relative to said fence portion to operate in said undercut portion thereof to abut a said platform and thereby provide means to position the platform in predetermined relationship to the said fence portion for the purpose set forth.

9. A device as described in claim 8, with a plurality of rollers on the said base portion and disposed to support a said platform during the loading thereof and to facilitate the manual moving of the same out of the device.

10. A device as described in claim 8, with vertically disposed rollers on the said fence portion to facilitate the horizontal movement of articles that may be loaded on a said platform and against the fence portion upon movement of such platform out of the device.

References Cited in the file of this patent

UNITED STATES PATENTS

| | | |
|---|---|---|
| 1,687,907 | Systrom et al. | Oct. 16, 1928 |
| 1,924,899 | Anderson | Aug. 29, 1933 |
| 2,598,222 | Cahners et al. | May 27, 1952 |
| 2,633,251 | Bruce | Mar. 31, 1953 |
| 2,642,221 | Offutt et al. | June 16, 1953 |
| 2,658,630 | Melin | Nov. 10, 1953 |